US008757107B2

(12) United States Patent
Owens

(10) Patent No.: US 8,757,107 B2
(45) Date of Patent: *Jun. 24, 2014

(54) HYDROGEN SUPPLEMENTAL SYSTEM FOR ON-DEMAND HYDROGEN GENERATION FOR INTERNAL COMBUSTION ENGINES

(71) Applicant: Donald W Owens, Temecula, CA (US)

(72) Inventor: Donald W Owens, Temecula, CA (US)

(73) Assignee: HNO Greenfuels, Inc., Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/844,267

(22) Filed: Mar. 15, 2013

(65) Prior Publication Data

US 2013/0186350 A1    Jul. 25, 2013

Related U.S. Application Data

(63) Continuation of application No. 12/790,398, filed on May 28, 2010, now Pat. No. 8,499,722.

(51) Int. Cl.
*F02B 43/08* (2006.01)

(52) U.S. Cl.
USPC .................. 123/3; 123/1 A; 123/1 R; 123/2

(58) Field of Classification Search
USPC .................. 123/1 A, 1 R, 2, 3, DIG. 12
See application file for complete search history.

(56) References Cited

U.S. PATENT DOCUMENTS

| 3,252,455 | A | * | 5/1966 | Hamilton ................ 126/263.05 |
| 3,433,729 | A |   | 3/1969 | Mikhailovich et al. |
| 4,025,405 | A |   | 5/1977 | Dotson et al. |
| 4,031,865 | A |   | 6/1977 | Dufour |
| 4,271,793 | A |   | 6/1981 | Valdespino |
| 4,368,696 | A |   | 1/1983 | Reinhardt |
| 5,272,871 | A |   | 12/1993 | Oshima et al. |
| 5,711,865 | A |   | 1/1998 | Caesar |
| 6,033,549 | A |   | 3/2000 | Peinecke et al. |

(Continued)

FOREIGN PATENT DOCUMENTS

| DE | 19504142 | 8/1995 |
| WO | 2009018814 | 2/2009 |
| WO | 2011150322 | 12/2011 |

OTHER PUBLICATIONS

J. Russell, et al "Hydrogen Generation by Solid Polymer Electrolyte Water Electrolysis", American Chemical Society, Chicago Symposium 1973, pp. 24-40.

(Continued)

*Primary Examiner* — Noah Kamen
*Assistant Examiner* — Long T Tran
(74) *Attorney, Agent, or Firm* — Brundidge & Stanger, P.C.

(57) ABSTRACT

A portable, on-demand hydrogen generation system producing hydrogen and injecting the hydrogen into the air intake of internal combustion engines. Hydrogen and oxygen is produced with an electrolyzer from nonelectrolyte water in a supply tank. The hydrogen and oxygen is passed back thru the supply tank for distribution and water preservation. The gases are kept separate by a divider in the tank. The device is optionally powered by the vehicle battery, a stand alone battery, waste heat of the internal combustion engine or solar energy. The system utilizes a vacuum switch or other engine sensor that permits power to the device and therefore hydrogen production only when the engine is in operation.

1 Claim, 2 Drawing Sheets

(56) References Cited

U.S. PATENT DOCUMENTS

| | | | |
|---|---|---|---|
| 6,257,175 B1* | 7/2001 | Mosher et al. | 123/3 |
| 6,688,120 B2 | 2/2004 | Aoki et al. | |
| 7,021,249 B1 | 4/2006 | Christison | |
| 7,143,722 B2* | 12/2006 | Ross | 123/3 |
| 7,458,368 B1 | 12/2008 | Huffman | |
| 7,552,702 B2* | 6/2009 | Stone | 123/3 |
| 2004/0013918 A1 | 1/2004 | Merida-Donis | |
| 2004/0025808 A1* | 2/2004 | Cheng | 123/3 |
| 2004/0203166 A1 | 10/2004 | Sullivan | |
| 2005/0229872 A1 | 10/2005 | Lange | |
| 2006/0051638 A1* | 3/2006 | Gross | 429/26 |
| 2007/0151865 A1 | 7/2007 | Shimko et al. | |
| 2007/0205111 A1 | 9/2007 | Bayliss | |
| 2007/0209608 A1* | 9/2007 | Rutledge | 123/3 |
| 2007/0259220 A1* | 11/2007 | Redmond | 429/12 |
| 2008/0257751 A1 | 10/2008 | Smola et al. | |
| 2009/0188240 A1 | 7/2009 | Suzuki et al. | |
| 2009/0283402 A1* | 11/2009 | Osman | 204/230.8 |
| 2010/0012090 A1 | 1/2010 | Lewis | |
| 2010/0183931 A1* | 7/2010 | Hedman | 429/428 |
| 2010/0236921 A1 | 9/2010 | Yang | |
| 2010/0275858 A1 | 11/2010 | Jeffs et al. | |
| 2011/0048961 A1 | 3/2011 | Smedley | |
| 2011/0290201 A1 | 12/2011 | Owens | |
| 2012/0055422 A1 | 3/2012 | Owens | |
| 2012/0073521 A1 | 3/2012 | Owens | |
| 2012/0073522 A1 | 3/2012 | Owens | |
| 2012/0073523 A1 | 3/2012 | Owens | |
| 2012/0073524 A1 | 3/2012 | Owens | |
| 2012/0073525 A1 | 3/2012 | Owens | |

OTHER PUBLICATIONS

C. Kim et al, "Hydrogen Production from Water Using Polymer Electrolyte Membrane", American Institute of Chemical Engineers, Nov. 7, 2004.

I. Papagiannakis, "Studying and Improving the Efficiency of Water Electrolysis using a Proton Exchange Membrane", Thesis Submitted to Strathclyde University, 2005.

* cited by examiner

HYDROGEN SUPPLEMENTAL SYSTEM FOR ON-DEMAND HYDROGEN GENERATION FOR INTERNAL COMBUSTION ENGINES

CROSS-REFERENCES

This is a continuation application of U.S. Ser. No. 12/790,398, filed May 28, 2010 the contents of which are incorporated herein by reference.

BACKGROUND OF THE INVENTION

1. Field of the Invention

The present invention relates to hydrogen generation devices. More particularly, the present invention relates to a hydrogen supplemental system that can be used with internal combustion engines for increased fuel efficiency and reduced carbon emissions.

2. Description of the Related Art

There are a number of devices on the market that create HHO gas, otherwise known as Brown's gas, which is used as a supplement to gasoline and diesel engines. HHO gas consists of two parts hydrogen to one part oxygen. These devices typically comprise an electrolyzer which decomposes water into hydrogen and oxygen. An example is U.S. Pat. No. 4,368,696. These Electrolyzers typically use an electrolyte, most notably KOH, Potassium hydroxide, or baking soda. A voltage is placed across the device to produce the HHO gas.

The main problem with most of these devices is that the energy required to produce the hydrogen creates a substantial load on the electrical system of the vehicle. Similar to running the air conditioner in any vehicle, the additional electrical load causes the miles per gallons to be reduced. Even though the hydrogen typically boosts the efficiency and miles per gallon of the vehicle, the additional electrical load on the vehicle to create the hydrogen is usually great enough to minimize or in many cases negate most or all of mileage gains of the vehicle.

Also, most HHO systems produce the hydrogen and oxygen in a combined gas stream. The hydrogen and oxygen gases are not generally separated from each other. In the case of modern gasoline powered vehicles, this extra oxygen is detected by the vehicle's oxygen sensors which communicate this extra oxygen level to an on-board computer, namely and Electronic Control Unit ECU of the vehicle. When the ECU detects this extra oxygen, it is a signal that the engine is running lean and the ECU adds more gasoline to the engine. This also negates most of the fuel efficiency gains.

Furthermore, HHO systems generally use either baking soda or Potassium Hydroxide KOH. KOH is generally preferred over baking soda because of its stability and because it causes less deterioration of stainless steel plates or other plates used in the electrolyzer. However, KOH has to be handled with care because it is caustic, and the crystals can be dangerous if not handled properly. The electrolyte normally has to be inserted into the unit at the proper proportions for optimum operation of the electrolyzer. Extreme care must be taken when using it. It is not the type of product you would generally like to put in the hands of an inexperienced consumer.

Complex installation is another issue with typical HHO systems. Space usually has to be found somewhere in the engine compartment or outside the vehicle. Since all vehicles are different, finding a suitable spot under the hood to install the device in many vehicles is next to impossible. Also, the systems are typically connected into the electrical systems of the vehicles which can cause blown fuses and a host of other problems if not installed properly. Hydrogen is only needed when the vehicle is actually running, not when the ignition is turned on. During the installation, care must be observed to make sure the electrical power is provided to the device only when the engine is running. Otherwise there can be hydrogen accumulation in the air intake. This further complicates the installation of these systems.

SUMMARY OF THE INVENTION

The present invention relates to a portable and compact, on-demand hydrogen supplemental system for producing hydrogen gas and injecting the hydrogen gas into the air intake of internal combustion engines, particularly for vehicles. Hydrogen and oxygen is produced by a fuel cell at low temperatures and pressure from water in a supply tank. The hydrogen gas and oxygen gas is passed back thru the supply tank for distribution and water preservation. The gases are kept separate by a divider in the tank and the water level in the tank. In the case of gasoline engines, the hydrogen gas is directed to the air intake of the engine while the oxygen gas is optionally vented to the atmosphere. The device can be powered by the vehicles alternator, a stand alone battery, waste heat or solar energy. The system utilizes a vacuum switch or other engine sensor that regulates power to the system and therefore hydrogen production for the engine only when the engine is running. Therefore as the hydrogen is produced it is immediately consumed by the engine. No hydrogen is stored on, in or around the vehicle.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

DETAILED DESCRIPTION OF THE INVENTION

The present invention as will be described in greater detail below provides an apparatus, method and system, particularly, for example, a hydrogen supplemental system used to increase the fuel efficiency and reduce carbon emissions for internal combustion engines. The present invention provides various embodiments as described below. However it should be noted that the present invention is not limited to the embodiments described herein, but could extend to other embodiments as would be known or as would become known to those skilled in the art.

Figure 1:
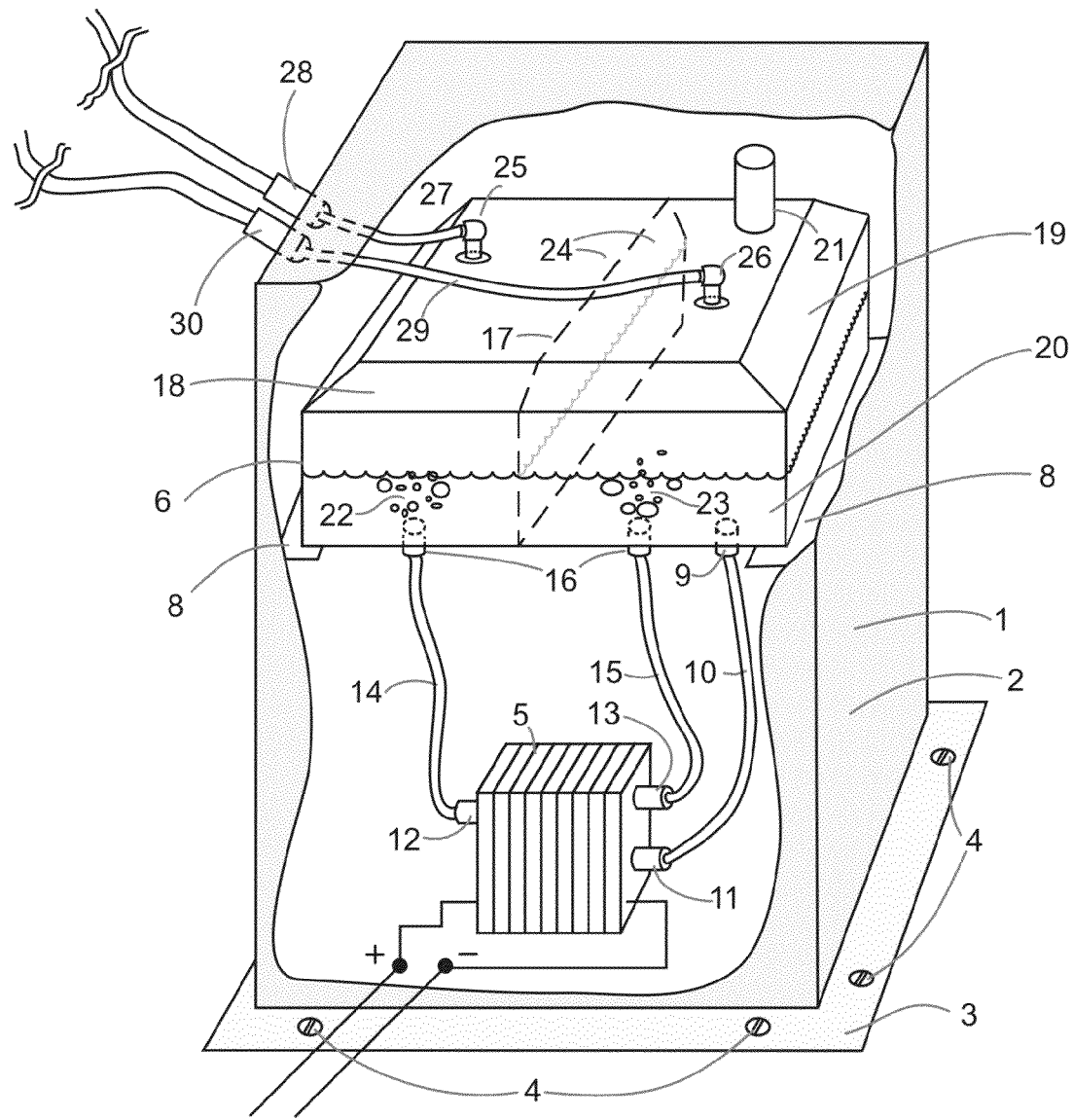
FIG. 1 is a detailed drawing of a portable hydrogen supplemental system showing a water tank and housing design according to the present invention.

The present invention as shown in FIG. 1 provides a portable hydrogen supplemental system 1 which includes a housing unit 2 that can be secured in the trunk or other flat surface of a vehicle by mounting bracket 3 and fastening units 4. Inside the housing unit 2 are a fuel cell 5 and a water tank 6 positioned above the fuel cell 5 arranged in such a manner as to supply water 7 to the fuel cell by gravity. As shown the fuel cell 5 is external of the water tank 6. The water tank 6 is supported in the housing unit 2 above the fuel cell by supporting means 8. The housing unit 2 is designed to be readily removable from the mounting bracket 3.

The water tank 6 includes a water supply fitting 9 positioned on the underside thereof connected to a tube or other supply means 10 that is in turn connected to water inlet fitting 11 on the fuel cell 5. Water, nonelectrolyte water, is supplied to the fuel cell 5 by the supply means 10. The fuel cell 5 also includes a hydrogen gas outlet fitting 12 and an oxygen gas outlet fitting 13 which are connected by tubes or additional supply means 14 and 15 to gas inlet fittings 16 on the underside of the water tank 6. The water tank 6 includes at least one divider 17 that divides the tank 6 into at least two sections, a hydrogen section 18 and an oxygen section 19. The divider 17 is formed along the inner wall of the tank 6 and extends to approximately ¼" from the bottom surface 20 of the tank 6. The tank 6 includes a fill spout 21 which permits the tank to be filled with nonelectrolyte water. As nonelectrolyte water is placed into the tank 6, the tank fills evenly on both sides of the divider 17.

The fuel cell 5, which is commonly known to produce electricity, is operated in reverse to produce hydrogen and oxygen gases. Thus, the fuel cell essentially operates as an electrolyzer, which as described above decomposes nonelectrolyte water into hydrogen and oxygen. Nonelectrolyte water fills the electrolyzer from the water tank and when a voltage, having positive and negative terminals, is placed across the electrolyzer 5, hydrogen and oxygen gases are produced on opposing sides of the electrolyzer 5.

As shown in FIG. 1 the electrolyzer includes a plurality of layers 510 which are non-liquid including at least two external layers 510-1 and 510-2 and an internal layer 510-3. In the electrolyzer 5 a first external layer 510-1 is connected to the positive terminal of the voltage and as such applies the positive side of the voltage to a first side of the internal layer 510-3. Further, in the electrolyzer 5 a second external layer 510-2 is connected to the negative terminal of the voltage and as such applies the negative side of the voltage to a second side of the internal layer 510-3. The first side of the internal layer 510-3 is opposite to the second side of the internal layer 510-3, thereby positioning the first and second external layers 510-1, 2 on opposite sides of the internal layer 510-3. In other words the internal layer 510-3 is positioned in adjacent contact between the external layers 510-1 and 510-2. Nonelectrolyte water is supplied to the plurality of layers 510 of the electrolyzer 5. The electrolyzer 5, by applying the voltage across the internal layer 510-3 via the first and second external layers 510-1, 2, separates the nonelectrolyte water into oxygen gas which is output by the oxygen gas outlet fitting 13 on the first side of the internal layer 510-3 and hydrogen gas which is output by the hydrogen gas outlet fitting 12 on the second side of the internal layer 510-3, said second side being opposite to the first side. The internal layer 510-3 could, for example, be made of a polymer electrolyte membrane (PEM) material as is known to those skilled in the art.

During operation of the electrolyzer 5, a small amount of nonelectrolyte water may be contained in hydrogen gas bubbles 22 and oxygen gas bubbles 23 as they emerge from the hydrogen outlet 12 and oxygen outlet 13, respectively, of the electrolyzer 5, and flow into the hydrogen side 18 and oxygen side 19 of the tank 6. The bubbles rise (travel) thru the nonelectrolyte water to upper air cavities 24 formed by the water level in the tank and the tank divider 17. Since the hydrogen and oxygen may contain a small amount of nonelectrolyte water, the hydrogen and oxygen gasses are passed back through the water tank 6 for water preservation so that said small amount of nonelectrolyte water will remain in the tank 6 rather than be retained in the gases. The hydrogen and oxygen gases are kept separate from each other in the upper cavities 24 by the divider 17 and water level in the tank. As the hydrogen gas and oxygen gas fill their respective upper cavities 24, the gas flows out of the upper cavities thru fittings 25 in the case of hydrogen, and fitting 26, in the case of oxygen on the upper side of the tank. The hydrogen gas flows thru tube 27 connected to hydrogen fitting 28 of the housing unit 2. The oxygen flows thru tube 29 connected to fitting 30 of the housing unit 2.

Figure 2:
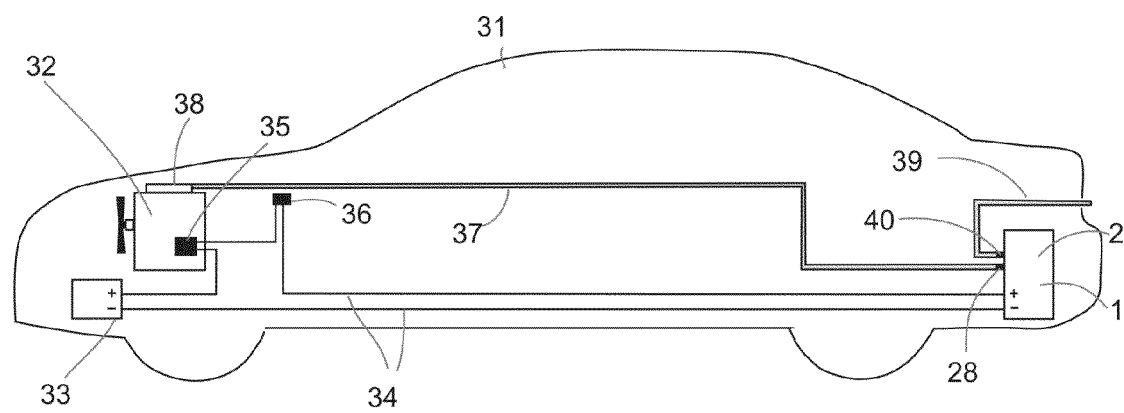
FIG. 2 is a schematic showing a portable hydrogen supplemental system installed in a typical vehicle according to the present invention.

As shown in FIG. 2, a vehicle 31 powered by a gasoline or diesel engine 32 is equipped with the portable hydrogen supplemental system 1. Power is supplied to the portable hydrogen supplemental system 1 by a vehicle battery 33 connected to electrical wires 34. The electrical circuit to the Hydrogen supplemental system includes a vacuum switch 35, or other engine sensor and an operator controlled switch 36 which completes the electrical circuit to the portable hydrogen generator system 1 when the engine is running. Once power is supplied to the portable hydrogen supplemental system 1, hydrogen gas flows thru hydrogen outlet tube 37 connected to hydrogen fitting 28 of the housing unit 2 to an air intake 38 of the vehicle's engine 32. Oxygen gas flows thru oxygen outlet tube 39 and, in the case of gasoline engines with oxygen sensors, is vented to the atmosphere. The two gasses can optionally be combined for diesel engine vehicles or other internal combustion engines without oxygen sensors.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A portable hydrogen supplemental system for supplying hydrogen gas to an internal combustion engine comprising:
    a housing unit;
    an electrolyzer mounted inside the housing unit that separates nonelectrolyte water into hydrogen and oxygen gas in response to electrical power;
    a nonelectrolyte water tank mounted inside the housing unit and positioned to supply nonelectrolyte water to the electrolyzer;
    a power supply for supplying the electrical power in the form of a voltage to the electrolyzer; and
    an engine sensor for detecting operation of the internal combustion engine
    wherein the electrolyzer, when supplied with electrical power, produces hydrogen and oxygen gases from the nonelectrolyte water being supplied from the nonelectrolyte water tank, and supplies, via the nonelectrolyte water tank, the hydrogen gas being produced to the internal combustion engine for combustion therein,
    wherein the electrolyzer is disposed external of the nonelectrolyte water tank,
    wherein the nonelectrolyte water tank includes a tank divider which separates the nonelectrolyte water tank into first and second tank sections that are both filled with the nonelectrolyte water when the nonelectrolyte water is input into the nonelectrolyte water tank,
    wherein the nonelectrolyte water tank includes at least first and second gas collection cavities at a top portion thereof for collecting hydrogen gas and oxygen gas respectively, the first and second gas collection cavities each being formed by a top surface of the nonelectrolyte water tank, the tank divider and the surface of the nonelectrolyte water in the nonelectrolyte water tank, wherein the first gas collection cavity includes a fitting at the top thereof for outputting the hydrogen gas out of the nonelectrolyte water tank to the internal combustion engine for combustion therein, wherein the second gas collection cavity includes a fitting at the top thereof for outputting the oxygen gas out of the nonelectrolyte water tank, wherein the power supply supplies electrical power to the electrolyzer when the engine sensor detects that the internal combustion engine is in operation, wherein the hydrogen gas supplied from the electrolyzer to the nonelectrolyte water tank is input to the first tank section, travels through the nonelectrolyte water in the first tank section, and collects in the first gas collection cavity, wherein the oxygen gas supplied from the electrolyzer to the nonelectrolyte water tank is input to the second tank section, travels through the nonelectrolyte water in the second tank section, and collects in the second gas collection cavity, wherein said electrolyzer comprises:

a plurality of layers, said layers being non-liquid and each layer being in adjacent contact with another one of said layers, wherein the plurality of layers includes at least two external layers and an internal layer which is disposed in adjacent contact between the external layers, wherein a first external layer is connected to a positive terminal of the power supply and as such applies the positive side of the voltage to a first side of the internal layer, and a second external layer is connected to a negative terminal of the power supply and as such applies the negative side of the voltage to a second side of the internal layer, said first and second sides being on opposite sides of the internal layer, and wherein when the voltage is applied across the first external layer, the internal layer and the second external layer, the electrolyzer separates the nonelectrolyte water into oxygen gas which is output on the first side of the internal layer and hydrogen gas which is output on the second side of the internal layer.

* * * * *